(12) United States Patent
Mokhberdoran et al.

(10) Patent No.: US 10,840,699 B2
(45) Date of Patent: Nov. 17, 2020

(54) FAULT CURRENT MANAGING BRANCH FOR SURGE-LESS CURRENT INTERRUPTION IN DC SYSTEM

(71) Applicant: EFACEC ENERGIA, MÁQUINAS E EQUIPAMENTOS ELÉCTRICOS, S.A., Guardeiras (PT)

(72) Inventors: Ataollah Mokhberdoran, Guardeiras (PT); Nuno Silva, Guardeiras (PT); António Carrapatoso, Oporto (PT); Adriano Da Silva Carvalho, Oporto (PT); Helder Leite, Oporto (PT)

(73) Assignee: EFACEC ENERGIA, MÁQUINAS E EQUIPAMENTOS ELÉCTRICOS, S.A., Moreira-Maia (PT)

( * ) Notice: Subject to any disclaimer, the term of this patent is extended or adjusted under 35 U.S.C. 154(b) by 307 days.

(21) Appl. No.: 15/751,971

(22) PCT Filed: Aug. 11, 2016

(86) PCT No.: PCT/IB2016/054850
§ 371 (c)(1),
(2) Date: Feb. 12, 2018

(87) PCT Pub. No.: WO2017/025927
PCT Pub. Date: Feb. 16, 2017

(65) Prior Publication Data
US 2018/0241202 A1    Aug. 23, 2018

(30) Foreign Application Priority Data

Aug. 11, 2015  (PT) .......................................... 108782
Aug. 12, 2015  (PT) .......................................... 108775

(51) Int. Cl.
*H02H 9/00*        (2006.01)
*H02H 3/087*       (2006.01)
(Continued)

(52) U.S. Cl.
CPC ............ *H02H 9/005* (2013.01); *H02H 3/087* (2013.01); *H02H 9/02* (2013.01); *H01H 33/596* (2013.01); *H02H 3/021* (2013.01)

(58) Field of Classification Search
CPC .......... H02H 9/005; H02H 3/087; H02H 9/02; H02H 3/021; H01H 33/596
(Continued)

(56) References Cited

U.S. PATENT DOCUMENTS

| | | |
|---|---|---|
| 4,300,181 A | 11/1981 | Premerlani |
| 4,618,905 A | 10/1986 | Tokuyama et al. |

(Continued)

FOREIGN PATENT DOCUMENTS

WO      2011157305 A1    12/2011

OTHER PUBLICATIONS

Jian-Guo et al. "Research on main circuit topology for a novel DC solid-state circuit breaker." Industrial Electronics and Applications (ICIEA), 2010 the 5th IEEE Conference on. IEEE, 2010. 5 pages.
(Continued)

*Primary Examiner* — Dharti H Patel
(74) *Attorney, Agent, or Firm* — Leason Ellis LLP

(57) ABSTRACT

A circuit breaker and fault current managing branch thereof for power transmission using Direct Current (DC) applications. A surge suppressor having DC bus terminal, transmission line terminal, and common terminal. An auxiliary branch comprises a pre-chargeable capacitor. The capacitor is charged by the DC bus before the circuit breaker is closed for operation and the capacitor is connected to be discharged to the transmission line when the circuit breaker is opened in operation, for suppressing the surge voltage across the circuit breaker. The auxiliary branch may comprise a charge sub-branch comprising a first controlled semiconductor switch for closing the charge sub-branch and charging the
(Continued)

capacitor by the DC bus before the circuit breaker is closed. The auxiliary branch may comprise a discharge sub-branch comprising a second controlled semiconductor switch for closing the discharge sub-branch and discharging the capacitor to the transmission line when the circuit breaker is opened in operation.

19 Claims, 17 Drawing Sheets

(51) Int. Cl.
*H02H 9/02* (2006.01)
*H02H 3/02* (2006.01)
*H01H 33/59* (2006.01)

(58) Field of Classification Search
USPC .......................................................... 361/58
See application file for complete search history.

(56) References Cited

U.S. PATENT DOCUMENTS 4,805,062 A * 2/1989 Shirouzu .............. H01H 33/596
361/13
2015/0280417 A1 10/2015 Shen

OTHER PUBLICATIONS

Magnusson et al. "Separation of the energy absorption and overvoltage protection in solid-state breakers by the use of parallel varistors." IEEE transactions on power electronics 29.6 (2014): 2715-2722.

Negari et al. "A new solid-state HVDC circuit breaker topology for offshore wind farms." Power Electronics for Distributed Generation Systems (PEDG), 2014 IEEE 5th International Symposium on. IEEE, 2014.

Sano et al. "A surgeless solid-state DC circuit breaker for voltage-source-converter-based HVDC systems." IEEE Transactions on Industry Applications 50.4 (2014): 2690-2699.

* cited by examiner (a)          (b)          (c)

FAULT CURRENT MANAGING BRANCH FOR SURGE-LESS CURRENT INTERRUPTION IN DC SYSTEM

CROSS-REFERENCE TO RELATED APPLICATIONS

This application is a U.S. National Stage Application under 35 U.S.C. § 371 of International Patent Application No. PCT/IB2016/054850, which was filed on Aug. 11, 2016, which claims priority to Portuguese Patent Application No. 108782, which was filed on Aug. 11, 2015, and Portuguese Patent Application No. 108775, which was filed on Aug. 12, 2015, all of which are hereby incorporated by reference in their respective entireties.

TECHNICAL FIELD

The present disclosure relates to a circuit breaker and fault current managing branch thereof, for power transmission using Direct Current (DC) applications, in particular for meshed DC grids, multi-terminal High Voltage Direct Current (HVDC) grids or HVDC lines.

BACKGROUND ART

Nowadays, electricity transmission and distribution by mean of Direct Current (DC) is becoming more popular. In the low and medium voltage level most of the traction systems employ DC networks to energize the trains. Additionally, the advantages and feasibility of DC distribution grids have been pointed out by many studies. The formation of smart grids can be more easier, since the intelligent power electronic devices (like power electronic based converters, fast communication based measurement systems, . . . ) are employed by DC distribution grids. In the high voltage level, DC transmission system is known to be the best choice for integration of bulk amount of electricity energy to the AC grid. Conventional current source converters (CSCs) are in operation in many DC links all over the world. On the other hand, voltage source converters (VSCs) offer many advantages like active and reactive power independent controllability and less cross section of the cable. Additionally, emerging multi-terminal DC grid is another motivation for the application of voltage source converters.

In spite of significant benefits of DC systems, the DC side short-circuit fault clearing is very challenging. Due to the lower inductance of DC transmission lines and cables and also contribution of DC bus capacitors into the fault current, DC short-circuit currents can rise up severely. To protect the converter against high and sharp short-circuit currents it is necessary to develop very fast fault current interruption technologies.

In last decades, attempts include research on electromechanical, solid-state and hybrid DC circuit breaker structures. As any other technologies, each of the mentioned structures has advantages and drawbacks. In recent years, high power semiconductor technology has improved significantly both in terms of current and blocking voltage rating for a single-chip device. These improvements and the expectation for more advances in future are motivations for research on topologies of fast solid-state circuit breakers. Furthermore, in the modern hybrid DC circuit breakers structure, the main fault current interruption action is usually done by the help of a solid-state circuit breaker (SSCB) branch. Thus, any improvement in SSCB technology may also improve the performance of hybrid circuit breaker topologies.

SSCB has been one of the research topics in high power electronics and DC grids area in recent years. A DC solid-state circuit breaker topology has been proposed in J.-g. Mu, L. Wang, and J. Hu, "Research on main circuit topology for a novel DC solid-state circuit breaker," in Industrial Electronics and Applications (ICIEA), 2010 the 5th IEEE Conference on, 2010, pp. 926-930. The proposed topology utilizes thyristors as the main interrupter and also in its auxiliary branches. In addition to complexity of the proposed circuit, the unidirectional operation of proposed SSCB can be mentioned as the main drawbacks of this topology. Z-source DC circuit breakers can also be considered as one of the structures of solid-state circuit breakers. These structures are usually proposed for medium DC voltage level. The bidirectionality of power flow in Z-source DC circuit breaker can be challenging.

One of the complexities in design of fast DC circuit breakers is limiting the overvoltage resulting from the release of stored energy in the inductive elements of DC system like DC cables and smoothing inductors. A research on separation of energy absorption branch and overvoltage suppression branch has been conducted in J. Magnusson, R. Saers, L. Liljestrand, and G. Engdahl, "Separation of the Energy Absorption and Overvoltage Protection in Solid-State Breakers by the Use of Parallel Varistors," *Power Electronics, IEEE Transactions on*, vol. 29, pp. 2715-2722, 2014. A surgeless solid-state circuit breaker is discussed in K. Sano and M. Takasaki, "A Surgeless Solid-State DC Circuit Breaker for Voltage-Source-Converter-Based HVDC Systems," *Industry Applications, IEEE Transactions on*, vol. 50, pp. 2690-2699, 2014 and the authors propose an overvoltage limiting and energy absorbing branch including diodes, resistors and none-linear surge arresters. Id. A solid-state circuit breaker topology employing passive elements for overvoltage suppression has been proposed in S. Negari and D. Xu, "A new solid-state HVDC circuit breaker topology for offshore wind farms," in *Power Electronics for Distributed Generation Systems (PEDG), 2014 IEEE 5th International Symp. on,* 2014, pp. 1-5. In addition to its unidirectional functionality, the proposed topology utilizes coupled inductors. In fact, implementation of mentioned inductors would be challenging for HVDC applications. More recently, the application of wide band semiconductor devices is also investigated.

Typically, fast solid-state DC circuit breakers consist of a number of semiconductor switches like IGBTs, IGCTs or power MOSFETs. Generally, to guarantee the bidirectionality of power flow, two unidirectional switches are connected to each other. FIG. 1 shows three possible connections for construction of bidirectional valves. In practice, the connection showed in FIG. 1 part (a) is usually used since it needs only one driver for both of the switches.

Absence of a natural zero crossing point for the current is a source of problem for fast switching actions in DC applications. FIG. 2(a) shows simplified equivalent circuit for a DC transmission system, including a circuit breaker, an ideal DC source, a line represented by a simple model and a short-circuit fault. The short-circuit fault divides the transmission line into two sections. After low impedance short-circuit fault happens in the DC line, the circuit breaker voltage can be given by (1).

$$V_{BR} = V_{DC} - R^1_{line} \cdot i_{sc} - L^1_{line} \cdot \frac{di_{sc}}{dt} \qquad (1)$$

Since the derivative of current is negative in short-circuit current interruption process, $(-L^1_{line} \cdot di_{sc}/dt)$ will be a positive value and the breaker voltage will increase. Typically, the rate of rise of DC short-circuit current is extremely high. Considering fast identification and interruption of fault current (less than 2 ms), the switching overvoltage can reach to more than 2 times of nominal value which can be definitely destructive for the breaking device and other components of DC system.

Two main topologies are introduced for solid-state DC circuit breakers in literature [14]. As it is depicted in FIG. 2(b), one of the topologies uses nonlinear resistors in parallel with the IGBTs to suppress the overvoltage and absorb the released energy. FIG. 2(c) shows another topology of SSCB which equipped with a set of freewheeling diodes in series with nonlinear resistors. The nonlinear resistors are usually available as metal oxide varistors (MOV) like ZnO surge arresters. Despite their common use, MOVs are known as expensive devices which also have the aging problems and even possibility of catastrophic failures [15].

These facts are disclosed in order to illustrate the technical problem addressed by the present disclosure.

The following references, should be considered herewith incorporated in their entirety:
[1] J.-g. Mu, L. Wang, and J. Hu, "Research on main circuit topology for a novel DC solid-state circuit breaker," in *Industrial Electronics and Applications (ICIEA)*, 2010 the 5th IEEE Conference on, 2010, pp. 926-930.
[2] J. Magnusson, R. Saers, L. Liljestrand, and G. Engdahl, "Separation of the Energy Absorption and Overvoltage Protection in Solid-State Breakers by the Use of Parallel Varistors," *Power Electronics, IEEE Transactions on*, vol. 29, pp. 2715-2722, 2014.
[3] K. Sano and M. Takasaki, "A Surgeless Solid-State DC Circuit Breaker for Voltage-Source-Converter-Based HVDC Systems," *Industry Applications, IEEE Transactions on*, vol. 50, pp. 2690-2699, 2014.
[4] S. Negari and D. Xu, "A new solid-state HVDC circuit breaker topology for offshore wind farms," in *Power Electronics for Distributed Generation Systems (PEDG)*, 2014 IEEE 5th International Symp. on, 2014, pp. 1-5.

SUMMARY OF THE INVENTION

It is described a surge suppressor for a DC power transmission circuit breaker having a DC bus terminal, a transmission line terminal, and a common terminal, said suppressor comprising an auxiliary branch comprising a pre-chargeable capacitor, wherein the auxiliary branch is arranged such that:
the capacitor is charged by the DC bus before the circuit breaker is closed for operation; and the capacitor is connected to be discharged to the transmission line when the circuit breaker is opened in operation, for suppressing the surge voltage across the circuit breaker.
In an embodiment, the auxiliary branch comprises a charge sub-branch connected between the DC bus terminal and the common terminal, said charge sub-branch comprising a first controlled semiconductor switch for closing the charge sub-branch and charging the capacitor by the DC bus before the circuit breaker is closed.

In an embodiment, the surge suppressor is arranged such that the first controlled semiconductor switch opens after the capacitor is charged.

In an embodiment, the charge sub-branch comprises a resistor and an inductance connected in series with said capacitor for limiting the value and rate of variation of the charge current of said capacitor, in particular within the operational limits of the first controlled semiconductor switch.

In an embodiment, the resistance of said charge sub-branch resistor is such that the charge current of said capacitor is within the operational limits of the capacitor.

In an embodiment, the auxiliary branch comprises a discharge sub-branch connected between the transmission line terminal and the common terminal, said discharge sub-branch comprising a second controlled semiconductor switch for closing the discharge sub-branch and discharging the capacitor to the transmission line when the circuit breaker is opened in operation, for suppressing the surge voltage across the circuit breaker.

In an embodiment, the surge suppressor is arranged such that the second controlled semiconductor switch opens after the capacitor is discharged.

In an embodiment, the discharge sub-branch comprises a resistor and an inductance connected in series with said capacitor for limiting the value and rate of variation of the discharge current of said capacitor, in particular within the operational limits of the second controlled semiconductor switch.

In an embodiment, the capacitance of the capacitor and resistance of the discharge sub-branch resistor are such that the stored energy by the pre-charged capacitor and by the cable inductance in operation is dissipated by said resistor without damage to the resistor or the circuit breaker.

In an embodiment, the first controlled semiconductor is a thyristor.

In an embodiment, the surge suppressor is arranged such that the trigger signal from the gate of the first controlled semiconductor is removed after the capacitor is charged.

In an embodiment, the first controlled semiconductor is a IGBT or IGCT or MOSFET or GTO.

In an embodiment, the second controlled semiconductor is a thyristor.

In an embodiment, the surge suppressor is arranged such that the trigger signal from the gate of the second controlled semiconductor is removed after the capacitor is discharged.

In an embodiment, the second controlled semiconductor is a IGBT or IGCT or MOSFET or GTO.

It is also described a circuit breaker comprising the surge suppressor according to any the disclosed embodiments.

In an embodiment, the main breaker unit of the circuit breaker is a solid-state circuit breaker.

In an embodiment, the main breaker unit of the circuit breaker is comprised of an association of IGBTs, IGCTs or power MOSFETs.

In an embodiment, the circuit breaker is for use in a point to point dc connection, meshed DC grid, multi-terminal HVDC grid, multi infeed HVDC grid or point to point HVDC line.

It is also described a direct-current power transmission line with two active grids at both ends of the transmission line, comprising two circuit breakers according to any the disclosed embodiments, each circuit breaker being arranged at one of the ends of the power transmission line.

It is also described a direct-current power transmission line with one active grid at one end of the transmission line, comprising one circuit breaker according to any of the disclosed embodiments, each circuit breaker being arranged at the active grid end of the power transmission line.

It is also described a direct-current power transmission grid comprising a plurality of circuit breakers according to any the disclosed embodiments, each circuit breaker being arranged at one end of each transmission line of the power transmission grid.

A semiconductor switch may comprise one active semiconductor or any number of semiconductor switches connected in series and/or parallel to support the voltage and current rating of system.

The polarity of the DC bus, DC line and thus the direction of the semiconductor switches can be reversed.

A transmission line can be based on any conducting technology including any kind of overhead lines, DC or HVDC insulated or non-insulated cables and superconducting DC or HVDC cables.

Depending on the application, the common terminal of the surge suppressor branch can be connected to the ground or any other point of the DC system.

The same inductance can be shared by charge and discharge sub-branches. The charge sub-branch may comprise a resistor, an inductance or both a resistor and an inductance for current-limiting. The circuit breaker may have its line terminal connected through an additional inductance.

The surge suppression may be full or partial, for example if the capacitor is not fully charged or the voltage of the charge is below nominal voltage.

The DC bus terminal is the terminal for connection to a DC source, DC load, DC converter, in particular a voltage source converter (VSC).

BRIEF DESCRIPTION OF THE DRAWINGS

The following figures provide preferred embodiments for illustrating the description and should not be seen as limiting the scope of invention.

DETAILED DESCRIPTION

Emerging DC grids applications demand fast short-circuit fault current interruption. Fast DC circuit breakers are identified as the feasible solution to handle the DC fault current. Switching overvoltage across the DC circuit breakers is destructive for the interrupter device and also for the other components of the system. The disclosed surge suppressor branch can attach to any kind of fast DC interrupter devices including the fast and ultra-fast hybrid DC circuit breakers and fast solid-state circuit breakers. An auxiliary branch for limiting and suppressing the excessive voltage across the fast DC circuit breaker for DC applications is discussed in this disclosure. Instead of conventional approaches, a pre-charged capacitor is used for soft switching. To clarify the current interruption concept a fast solid-state circuit breaker (SSCB) is equipped by the surge suppressor auxiliary branch and different modes of operation of the fast DC circuit breaker are analysed and also design process of circuit parameters are described. Finally, main results are presented.

The topology of the disclosed surge suppressor branch in integration with a fast solid-state DC circuit breaker is discussed in this section. To have an application example of the disclosed surge suppressor device, its application in an HVDC link is illustrated, but other applications in DC power transmission are possible beyond HVDC.

Figure 1:
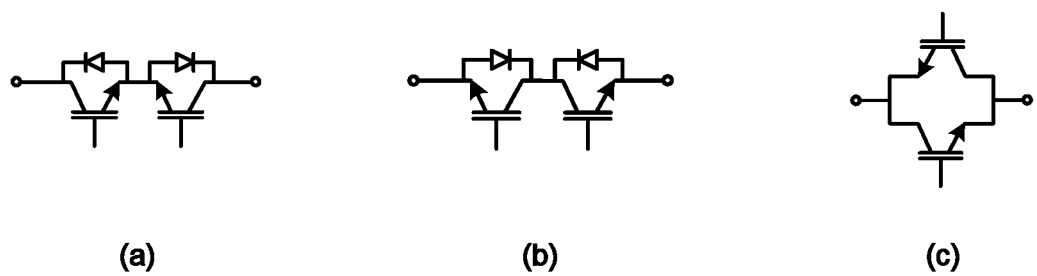
FIG. 1: Schematic representation of bidirectional semiconductor valves.
Figure 2A:
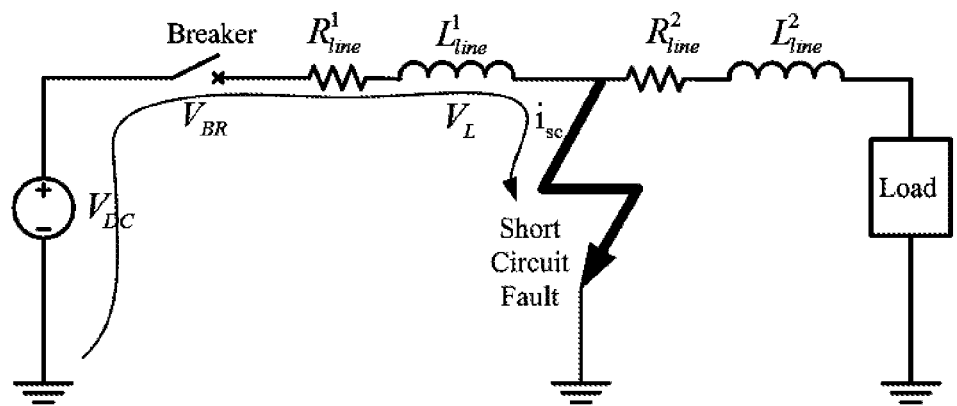
FIG. 2(a): Schematic representation of simplified equivalent circuit of a DC system.
Figure 2B:
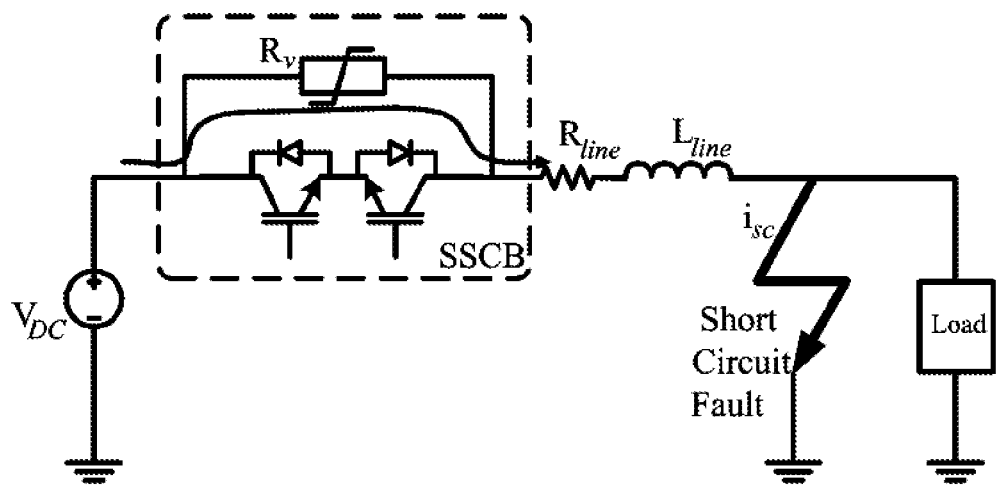
FIG. 2(b): Schematic representation of typical SSCB structure with MOV in parallel.
Figure 2C:
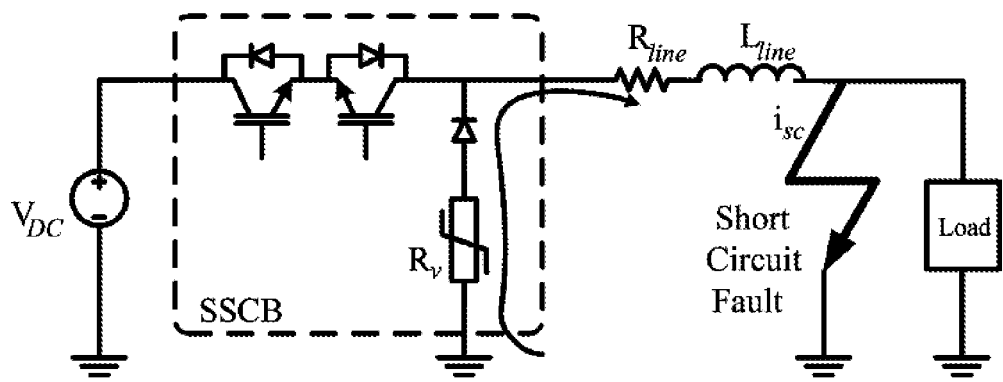
FIG. 2(c): Schematic representation of typical SSCB structure with MOV in series with freewheeling diode.
Figure 3A:
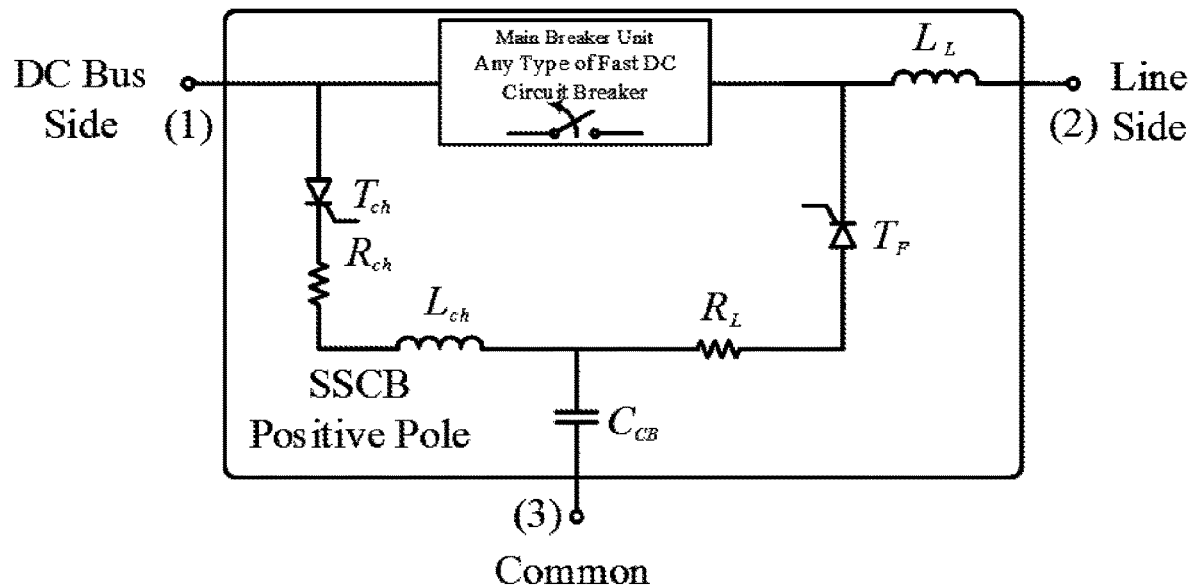
FIG. 3(a): Schematic representation of a three terminal SSCB with the disclosed surge suppressor branch for positive polarity.
Figure 3B:
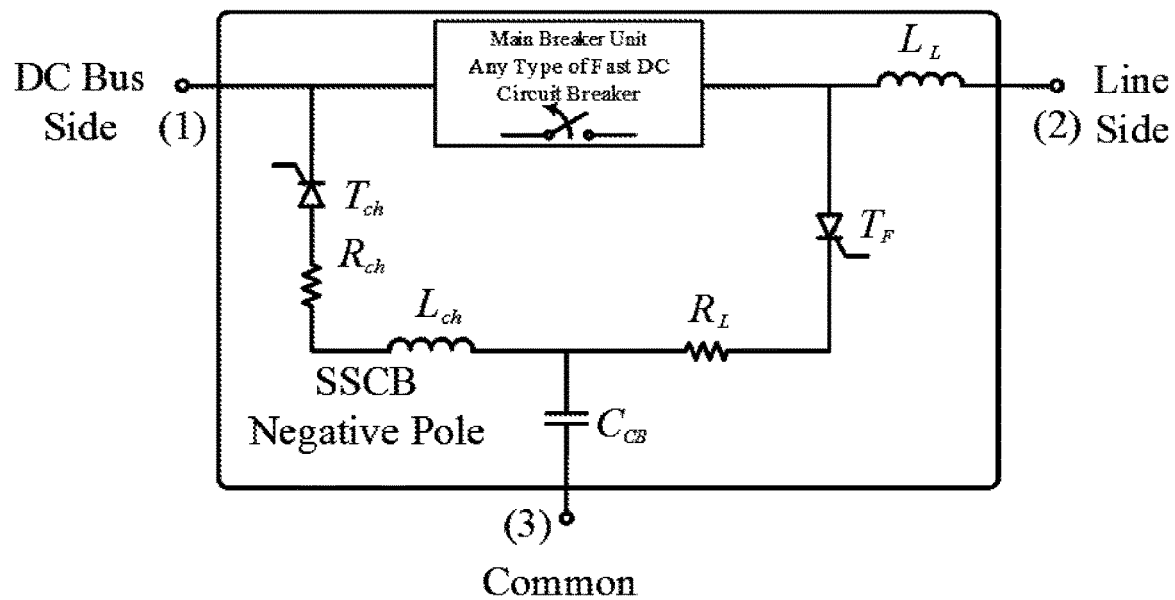
FIG. 3(b): Schematic representation of a three terminal SSCB with the disclosed surge suppressor branch for negative polarity.

The schematic of the disclosed surge suppressor branch attached to fast DC circuit breaker is depicted in FIG. 3(a) and FIG. 3(b). FIG. 3(a) shows the disclosed surge suppressor branch and arrangement of its components for positive polarity of any DC system whereas the FIG. 3(b) illustrates the mentioned items for the negative polarity of the DC system.

Figure 4:
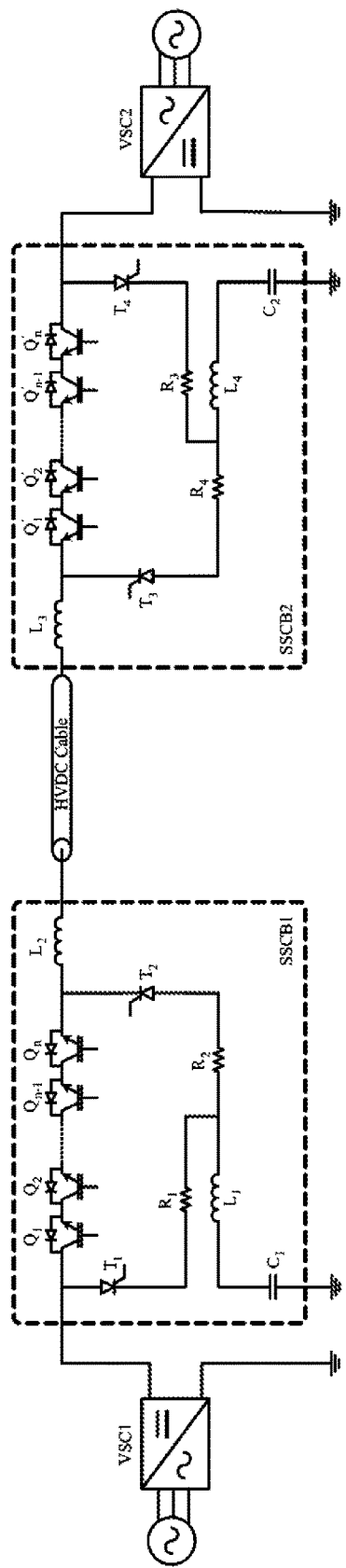
FIG. 4: Schematic representation of HVDC transmission line equipped by an embodiment of the SSCB at the both ends.

FIG. 4 shows a point to point VSC-HVDC connection which is equipped by the disclosed SSCB at the both ends of the transmission line. From technical point of view both of the circuit breakers are the same. The SSCB has a main breaker unit which can be implemented by series and parallel connection of IGBTs or IGCTs or any other kind of fast gate controlled semiconductor switches. In addition to the main breaker unit two thyristor banks are also employed. The thyristors of the disclosed surge suppressor branch can be replaced by any type of gate controlled semiconductor switches like IGBTS, IGCTs, GTOs and MOSFETs. Capacitor $C_1$ and resistor $R_2$ play the main roles in fault current interruption and overvoltage limiting process. $L_2$ is employed to limit the rate of rise of fault current. Typically, HVDC transmission lines utilize current smoothing inductors which can be combined with the current limiting inductor of the circuit breaker. Combination of disclosed surge suppressor branch to any kind of fast DC circuit breaker can remove the application of nonlinear surge arrestors like MOVs. MOVs could present beside the disclosed surge suppressor branch as a backup protective device and not for energy absorbing purposes.

During normal operation condition the circuit breaker should be closed to maintain the power flow from the rectifier side to the inverter side of the HVDC system. Considering VSC1 as the rectifier and VSC2 as the inverter side of depicted HVDC connection in FIG. 4, after turning on the main breaker unit (controlled semiconductor switches) of SSCB1 and SSCB2 the current flows through the semiconductor switches of SSCB1 into the DC transmission line and then via the semiconductor switches (e.g. anti-parallel diodes) of the SSCB2 into the inverter. Similar situation will happen if the power flow direction changes. After detection of a short-circuit fault and receiving the trip signal from the protection system, the fault clearing process must be started.

Figure 5:
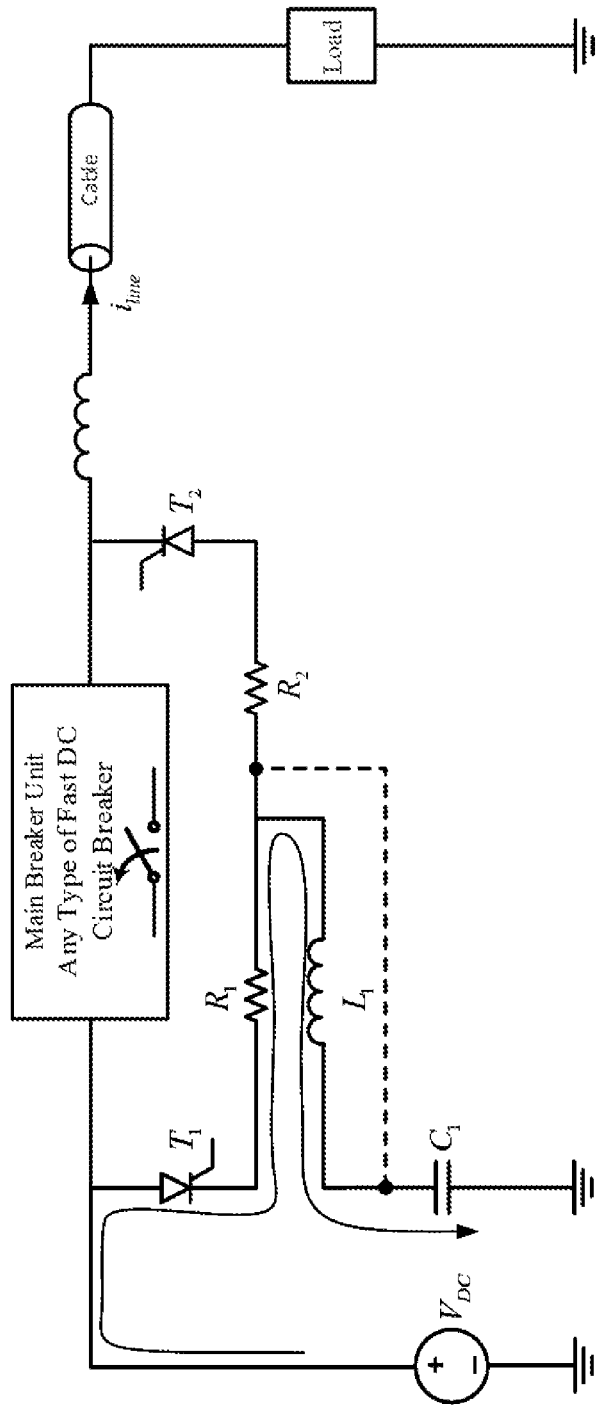
FIG. 5(a): Schematic representation of the charging stage of an embodiment of the circuit breaker.
FIG. 5(b): Schematic representation of the current flow in normal condition of an embodiment of the circuit breaker.

At the initial state of the circuit breaker all the thyristors and the semiconductor switches of the main breaker unit are in off state. As the first step of turn-on process, if the DC bus of the converter is energized and has the rated voltage, $C_1$ should be charged up to the nominal voltage level. Charging of $C_1$ commences after triggering the gate of $T_1$. The equivalent circuit for the charging stage of the capacitor is shown in the FIG. 5(a). The current flows through $R_1$ and $L_1$ and charges $C_1$. Since capacitors have a limited charging current peak, $R_1$ is employed to control the maximum current while $L_1$ limits the derivative of charging current. Limiting the rate of rise of charging current is necessary because the thyristors also have specific di/dt capabilities. $T_1$ naturally turns off after the charging current falls below the holding current of the thyristor. If $T_1$ is not a thyristor and is an IGBT or IGCT or MOSFET it should turn off by removing the trigger signal from its gate. If the DC bus is not energized yet, like the DC bus of VSC2 in FIG. 4 which is the DC bus of the inverter side, then $T_4$ will not be triggered. In fact, the charging stage the SSCB at the inverter side will only be done after the inverter DC bus reaches the system rated voltage.

Figure 5B:
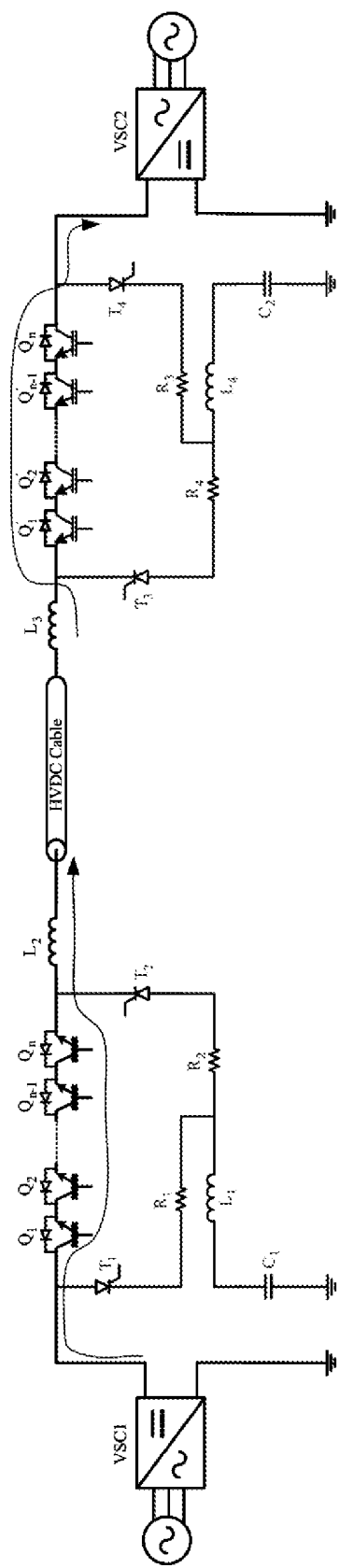

The next step is to close the main breaker unit. Closing process of main breaker unit can be done by sending turn-on signal to the semiconductor switches drivers. Depend on the voltage and current rating of system, main breaker unit may consist of a number of semiconductor switches in series and parallel. Number of semiconductor switches in series can be defined by the rated and surge voltage of system while the number of parallel branches can be defined by maximum continuous and the surge current of the system. The equivalent circuit of system in normal operation mode is shown in FIG. 5(b).

Figure 6A:
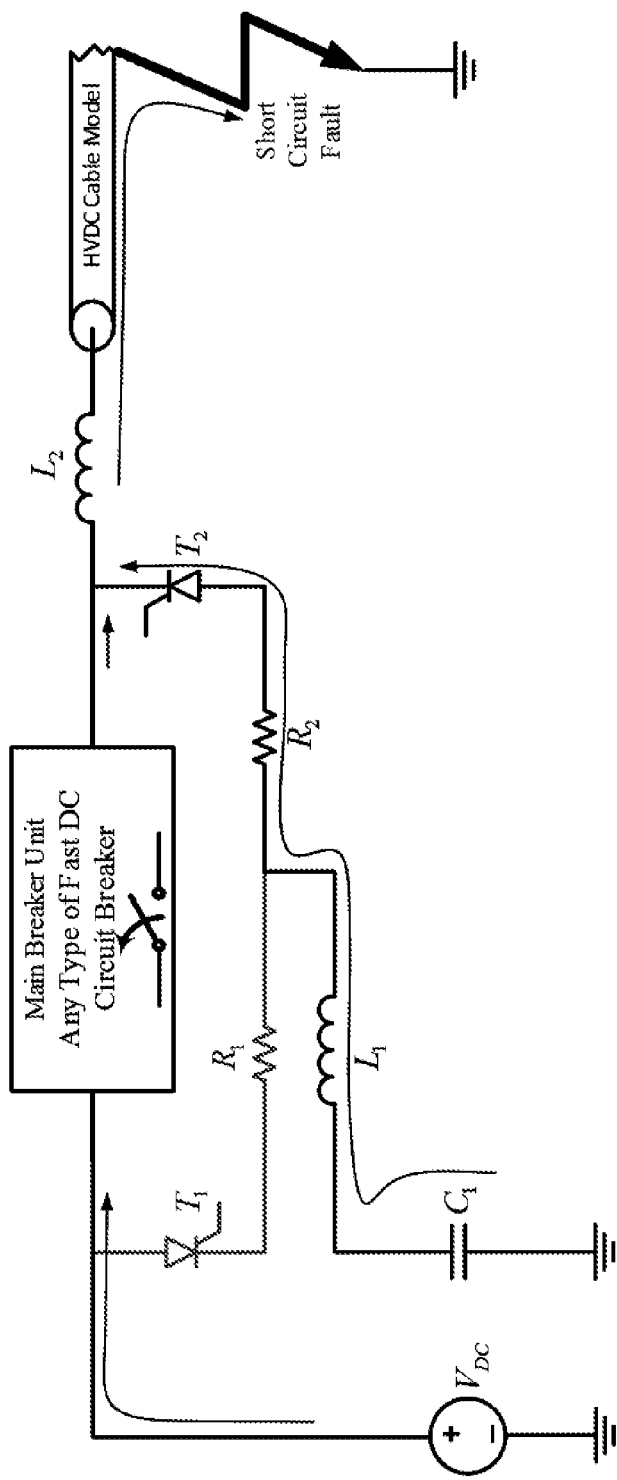
FIG. 6(a): Schematic representation of the initial interruption stage of an embodiment of the circuit breaker.

After a pole to pole short-circuit or a pole to ground fault happens in the HVDC transmission line, the fault detection relay detects the fault and sends the interruption command to the control system of the circuit breaker. The fault current flows through the main breaker unit, until the trip signal is received. Thereafter, the main interruption process starts. Concurrent with turning the main breaker unit off, $T_2$ must be triggered. This will connect the $C_1$ to the fault current path via $L_1$ and $R_2$ and will let the $C_1$ to feed the fault impedance while the main breaker unit is being turn off. In this surge suppressor branch $R_2$ can be directly connected to the $C_1$. In this case after triggering the $T_2$ the $C_2$ will be connected to the fault current via $R_2$ and $L_1$ will not be a part of this circuit. This alternative is depicted by dashed line in the FIG. 5(a). The equivalent circuit for this phase of operation is shown in FIG. 6(a). After the main breaker unit completely turned off, $C_1$ continues feeding the fault impedance. The stored energy in pre-charged capacitor and also cable inductance will be naturally dissipated in $R_2$, cable resistance and fault impedance. The equivalent circuit of final phase of interruption process is depicted in FIG. 6(b).

Figure 6B:
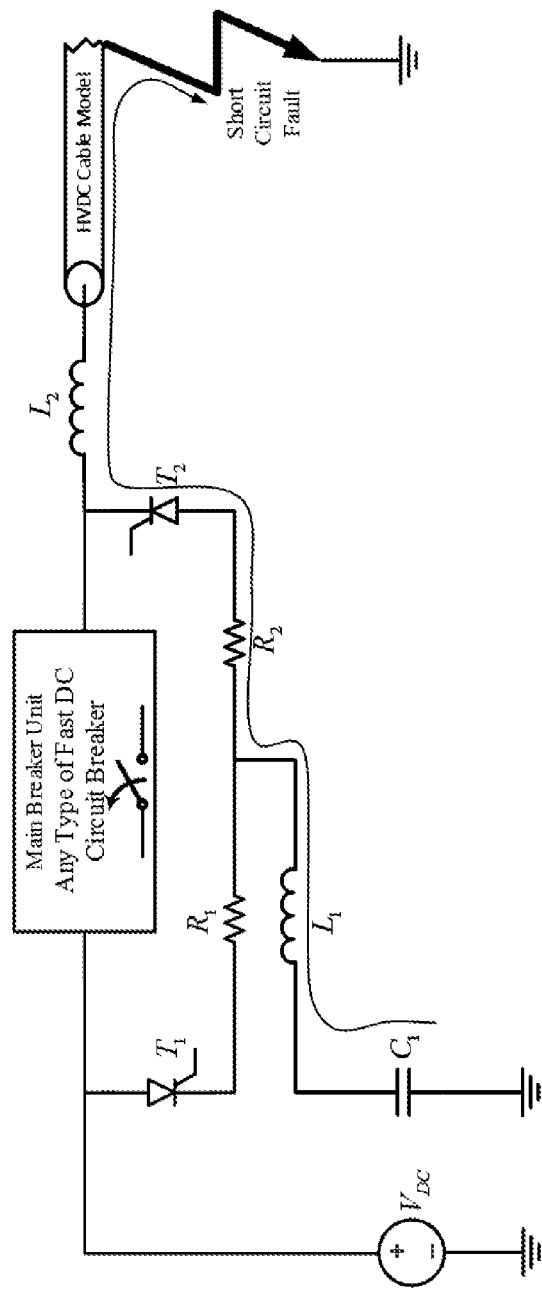
FIG. 6(b): Schematic representation of the final interruption stage of an embodiment of the circuit breaker.

Assuming simple model of transmission line, it can be seen from FIG. 6(b) that the final equivalent circuit is actually a series RLC circuit. Needless to say that $T_2$ will turn off naturally after the fault current falls below its holding current value. After interruption process is completed and $C_1$ is discharged, the circuit breaker is ready to start operation again in normal conduction mode and repeat the fault current interruption process. If the inverter side of system is connected to a grid without generation units or only to loads, the SSCB2 can be eliminated since there is no need for current interruption at the load side.

C1 charges up to the nominal voltage of system prior to operation of circuit breaker. The main advantage of having the capacitor pre-charged is to provide the system with the capability of suppressing the surge voltage across the circuit breaker during the interruption process of the DC fault current right after closing the breaker. This situation can happen when a fault in the DC line happens before closing the circuit breaker or a previously happened DC fault has not been removed yet.

Additionally, it is an advantage of the disclosure to use thyristors or other gate controlled switches in the surge suppressor branch. In case of fault in DC bus of system which is behind the circuit breaker (between the circuit breaker and the VSC, i.e. the side opposite to the transmission line), it is possible to prevent the capacitor from discharging and avoiding that the charged capacitor contributes to the fault situation. In this situation of a fault behind the circuit breaker. It is a particular feature and advantage of the disclosure that a second circuit breaker, with a surge suppressor as disclosed, arranged at the end of the transmission line, is in fact well equipped to break the circuit and suppress the surge because of the fault that occurred behind the first circuit breaker.

In order to clarify the calculation method of parameters, design procedure is explained in this section. Parameters of circuit breaker should be designed based on the power and voltage rating of system. IGBTs or IGCTs could be used in main breaker unit. To support the nominal voltage and current rating of the system, semiconductor switches should be connected in series and parallel. The number of IGBTs or IGCTs in series is given by (2).

$$N_{sw} = \frac{V_{DC}}{V_{CE,DC}} \qquad (2)$$

where $N_{sw}$, $V_{DC}$ and $V_{CE,DC}$ are the number of semiconductor switches in series, nominal DC voltage of the system and permanent DC voltage across the switch for 100 FIT failure rate, respectively. The number of switches in parallel could also be calculated based on the possible peak of fault current and the repetitive surge current of the IGBTs. Generally, for calculating the parameters of circuit breaker the worst cases should be considered. Approximated conduction loss of the circuit breaker is given by following equation:

$$P_{loss} = N_{sw} \times V_{sat} \times I_{line} \quad (3)$$

where $V_{sat}$ is the saturation voltage of switch in conduction mode and also $I_{line}$ is the nominal current of system. Despite the conventional structures which usually employ two IGBTs in their valve cells to guarantee the bidirectional current flow, the disclosed SSCB uses only one IGBT instead of two. In the other word, for the equal rated voltage levels, the number of IGBTs in the disclosed SSCB is half of the number of IGBTs in conventional approaches. Considering the current path in the disclosed SSCB and the conventional ones, it is expected to have significantly reduced losses.

The value of $L_1$ should be calculated based on di/dt capability of $T_1$ and $T_2$ to protect them from destructive rate of rise of current. $L_1$ must limit the di/dt below than $(di_T/dt)_{cr}$ which is critical current derivative for the semiconductor switch. $R_1$ is responsible to limit the peak of charging current of capacitor. So it can be calculated considering the maximum peak current of $C_1$. $L_2$ is employed for limiting the rate of rise of fault current particularly when the fault is occurred very close to the circuit breaker. In this case, because of absence of the cable or overhead line inductance, fault current could rapidly reach to destructive high values. The value of $L_2$ must be calculated considering the maximum allowable repetitive surge current of power semiconductor switches, fault detection threshold, the delay of fault identification relay and system current smoothing reactors. Assuming repetitive surge current of switches as $I_{CRM}$ and a safety factor of 1.5 and $T_{Delay}$ as the fault identification circuit delay and also $I_{th}$ as the threshold level for overcurrent protection following expressions can be developed:

$$I_{max} = \frac{I_{CRM}}{1.5} \quad (4)$$

$$\Delta I = I_{max} - I_{th} \quad (5)$$

$$L_2 = \frac{V_{DC} \times T_{delay}}{\Delta I} - L_{smoothing} \quad (6)$$

The main parameters of the circuit breaker are the $C_1$ and $R_2$. The equivalent circuit depicted in FIG. 6(c) represents a series RLC circuit. The differential equation for this circuit is given by (7).

$$\frac{d^2 i(t)}{dt^2} + \frac{(R_2 + R_{fault} + R_{cable})}{(L_1 + L_2 + L_{cable})} \frac{di(t)}{dt} + \frac{1}{(L_1 + L_2 + L_{cable}) \cdot C_1} i(t) = 0 \quad (7)$$

The damping factor of equivalent RLC circuit can be given by (8).

$$\xi = \frac{(R_2 + R_{fault} + R_{cable})}{2} \sqrt{\frac{C_1}{(L_1 + L_2 + L_{cable})}} \quad (8)$$

When $\xi > 1$ the circuit has an over-damped response while for $\xi < 1$ the response is under-damped. For proper operation of the circuit breaker the worst scenario should be taken into account and the parameters of equivalent circuit should be calculated for the over-damped response.

The value of $R_2$ should be calculated based on the maximum possible value of fault current at the interruption instant which is the $I_{max}$. It is also necessary to consider a safety factor (k) for practical implementation purposes. k can lie in the range of 1.1 to 1.5. Hence $R_2$ can be given by:

$$R_2 = \frac{V_{C_1}}{k \cdot I_{max}} \quad (9)$$

After defining the value of $R_2$ it is possible to calculate the value of $C_1$. The worst case for calculating the value of $C_1$ is to have a short-circuit fault at the end of the transmission line. In this case, a large amount of energy is stored in the transmission line. So for calculation of $C_1$ the total value of cable inductance must be considered. Moreover, the fault impedance and the cable resistance should be neglected to consider the worst case. Therefore, assuming $\xi > 1$ the value of $C_1$ is obtainable with the following equation:

$$C_1 > \frac{4 \times (L_1 + L_2 + L_{cable})}{(R_2)^2} \quad (10)$$

Figure 7:
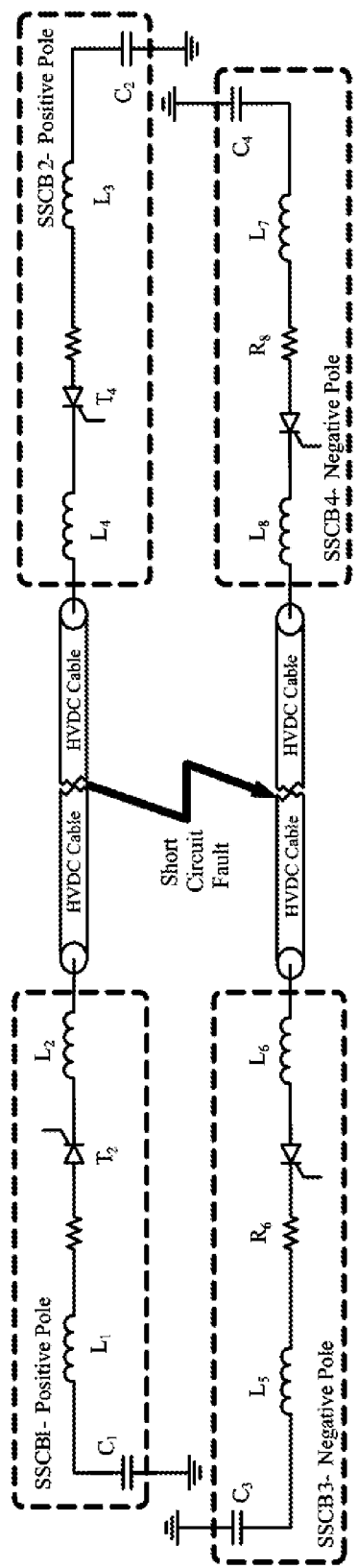
FIG. 7: Schematic representation of the final interruption stage simplified equivalent circuit for pole to pole short-circuit fault according to an embodiment of the circuit breaker.

The design of the circuit breaker based on the pole to ground fault can also cover the pole to pole faults. In fact, pole to pole faults can happen in symmetric monopole and the bipolar HVDC systems. Since there are two SSCBs which are installed at the both ends of the transmission lines, and also system has two transmission lines hence four SSCBs work together to protect the system. In case of a pole to pole short-circuit fault the inductance of system including the smoothing reactors, limiting inductors of SSCBs and the transmission line resistance and also limiting resistance of SSCBs are doubled. If the new values are put in equation (10) the capacitor value will be obtained equal to half of calculated value for the studied pole to ground case. But, in fact, since two SSCBs from each pole of converter interrupt the fault current so two capacitors will be in series connection with each other and this will reduce their total capacity to the half of each one. Therefore the calculated value is still valid for the pole to pole fault. The simplified equivalent circuit of a symmetric monopole system under pole to pole fault at the final stage of the interruption is shown in FIG. 7.

Figure 8:
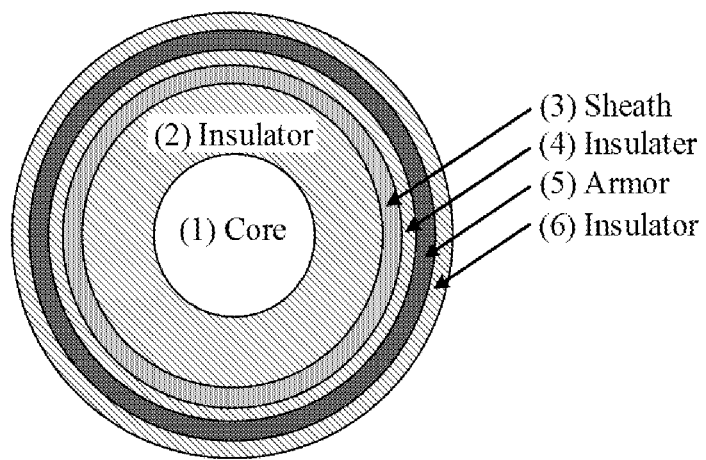
FIG. 8: Schematic representation of cross-section of a 320 kV XLPE insulated HVDC cable.

Parameters of circuit breaker are designed based on assumed ratings of a symmetric monopole HVDC system which are presented in Table. I. To achieve more accurate results, the simulation study is carried out in electromagnetic transient type software namely PSCAD. HVDC cable is modelled by frequency dependent cable model with inserting the physical features of the cable in PSCAD. The physical dimensions of the cable obtained from [18]. FIG. 8 depicts the cross section of the HVDC cable.

Figure 9:
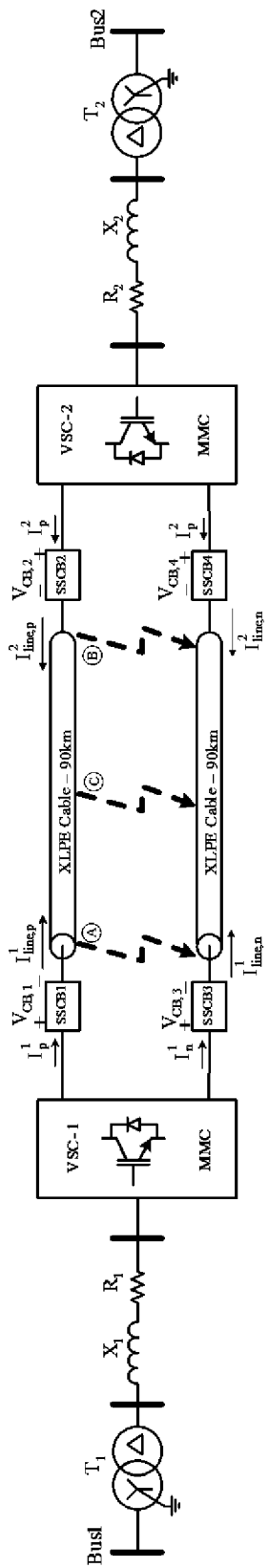
FIG. 9: Schematic representation of the system under study according to an embodiment of the circuit breaker.

Since the modern HVDC systems relies on modular multilevel converters (MMC), the simulation study is performed on MMC based HVDC system. The MMCs are modelled as average models. FIG. 9 shows the schematic of studied system. Table. II shows the parameters of designed SSCB.

To perform the study and analyse the results a pole to pole short-circuit fault is supposed to happen at t=2s. In this study it is supposed to install the SSCB between the converter and the smoothing reactor. The IGBTs of the MMCs are also blocked after detection of a short-circuit fault. Additionally, the short-circuit fault is analysed at 3 different points. As it can be seen from FIG. 9, point A is very close to the rectifier while point B is 90 km far from the rectifier and it is very close to the inverter. Point C has 45 km distance from both of the converters. To validate the functionality of the SSCB a threshold based protection scheme is modelled. When the fault current reaches the threshold level of protection system the interruption process starts. To consider the practical implementation limitations, the delay of current sensors and also fault identification relay is supposed to be 500 μs.

TABLE I

Assumed system parameters

| MMC Power | 1000 MVA | Cable Length | 90 km | Transformer | Y/D |
|---|---|---|---|---|---|
| Nominal Voltage | ±320 kV | Smoothing Reactor | 15 mH | AC source | 230 kV |
| Configuration | Sym. monopole | Fault Impedance | 0.1Ω | MMC Type | Half-bridge |

TABLE II

Designed SSCB parameters

| $I_{th}$ | 3 kA | $R_1$ | 3 kΩ | $L_1$ | 50 μH |
|---|---|---|---|---|---|
| $C_1$ | 350 μF | $R_2$ | 30 Ω | $L_2$ | 10 mH |

Figure 10:
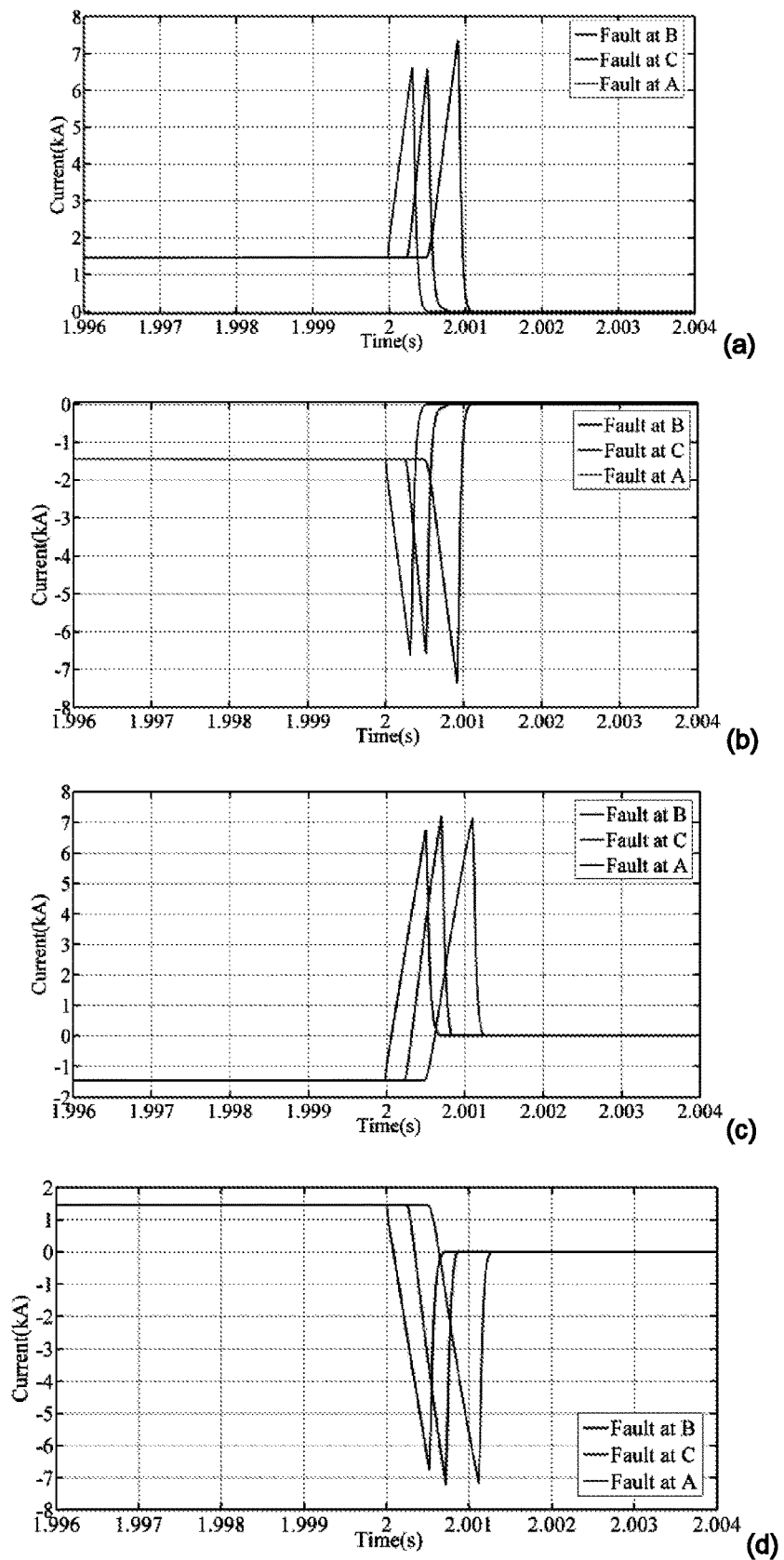
FIG. 10: Schematic representation of converter currents: (a) rectifier positive pole, (b) rectifier negative pole, (c) inverter positive pole, (d) inverter negative pole.

FIG. 10(a) depicts the $I_p^1$ which is the current of the positive pole of the MMC1 for different fault locations. When the fault is at the point A which is very close to the rectifier the fault current rises sharply. The main reason for the high rate of rise of current is the absence of transmission line inductance. On the other hand, for the faults with far distance from the rectifier like the fault at the point B, the fault current starts rising with a delay. It is clear that the cable inductance resists against the change of current. $I_n^1$ which is the current of the negative pole of the MMC1 is also shown in FIG. 10(b). The same explanation is also valid for the negative pole current during the short-circuit fault. At the inverter side of the system, the current ($I_p^2$) has a negative value in the positive pole. When a short-circuit fault happens in the transmission line, the direction of current reverses and increases until reaches the protection threshold. The current reversal is because of the anti-parallel diodes of IGBTs. In fact, even after blocking the IGBTs, the MMC is still defenceless against the pole to pole short-circuit and it feeds the fault current. The situation is similar for the negative pole of the inverter. FIG. 10(c) shows the inverter positive pole current for different fault locations. $I^2$, which represents the inverter negative pole current is depicted in FIG. 10(d).

All the waveforms present an ultra-fast interruption of the fault current and cutting it from the related converter. The interruption time is less than 300 μs. The ultra-fast operation of the circuit breaker prevents the fault current from reaching very high values. Consequently, interrupting the current at lower values leads to smaller footprint of the circuit breaker.

Figure 11:
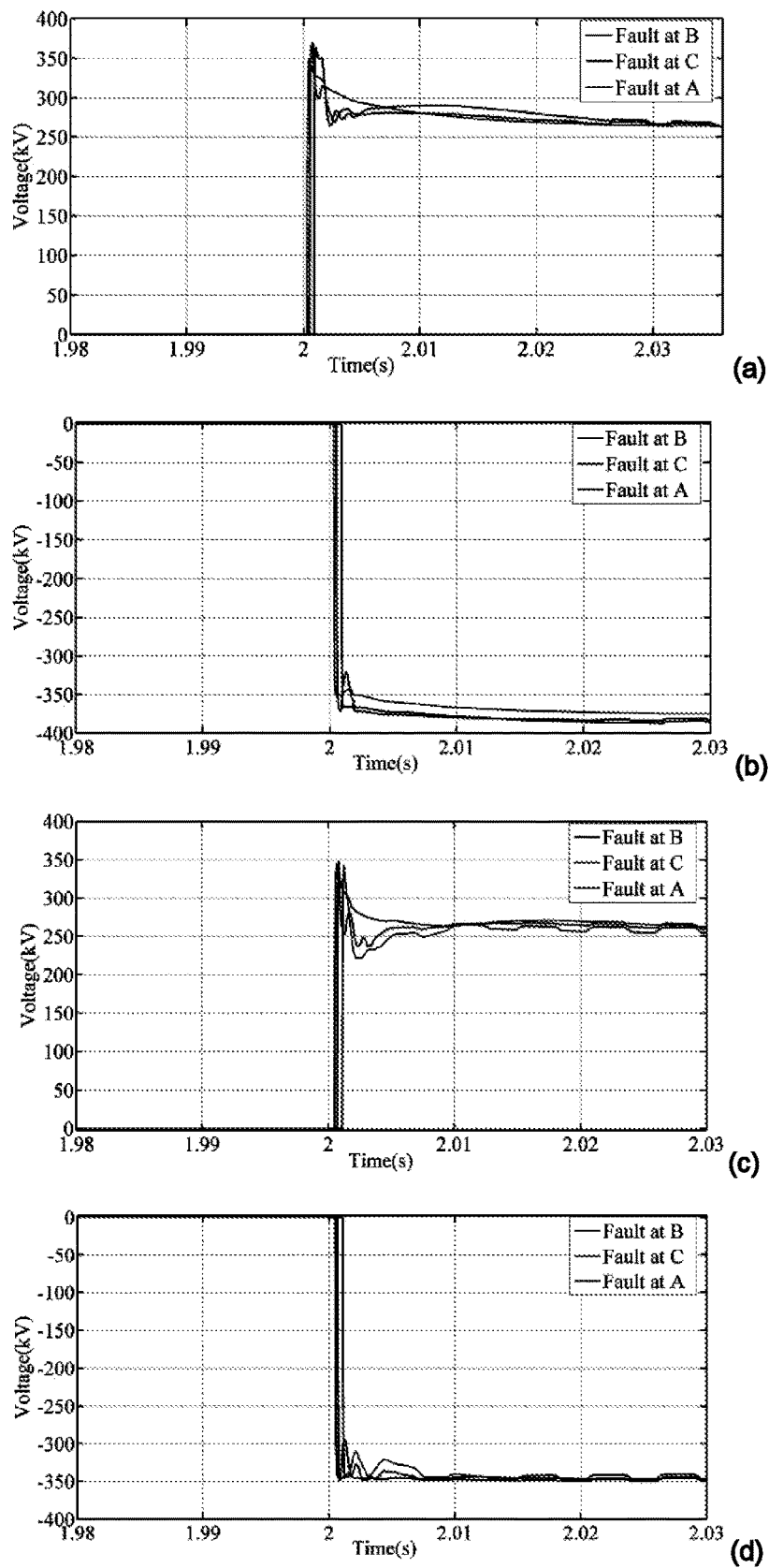
FIG. 11: Schematic representation of circuit breakers voltage at: (a) rectifier positive pole, (b) rectifier negative pole, (c) inverter positive pole, (d) inverter negative pole.

In addition to the ultra-fast operation of the disclosed solid-state circuit breaker, having limited transient surge voltage is also one of its significant features. Despite the conventional topologies for the solid-state circuit breakers which utilize the nonlinear surge arrestors to absorb the stored energy and also clamp the overvoltage, the disclosed topology uses a concept in cutting the converter current safely and discharging the cable energy naturally. FIG. 11 illustrates the circuit breakers voltage around the interruption instant for the 3 different fault locations.

It can be seen in FIG. 11(a) that not only is the transient overvoltage limited to less than 370 kV but also has only 2 ms time duration which lies in the safe operation area of all the power electronic components of the system with a large safety margin. When the fault is very close to the circuit breaker like the fault at point A, the overvoltage is lower than the other cases. FIG. 11(b) shows the circuit breaker voltage for the negative pole of the rectifier. It can also be seen that the overvoltage is limited to less than 380 kV. The inverter positive pole circuit breaker voltage is depicted in FIG. 11(c). The surge voltage is limited to less than 350 kV. As it is shown in FIG. 11(d) the transient surge voltage of the circuit breaker for the negative pole of the inverter is also limited to less than 380 kV. Therefore, it can be observed that the surge voltage is limited to almost 18% of the rated voltage without use of the surge arrestors. Surge arrestors can be attached to the disclosed topology, advantageously only as common protective devices. Since the surge arrestor is not used for the energy absorption purpose in this topology, it has smaller size and footprint than the conventional design.

As it was mentioned in previous sections, the disclosed DC circuit breaker interrupts the fault current from the converter by connecting a limited voltage source (capacitor) to the cable to allow the fault current to continue until dissipates naturally in a formed equivalent RLC circuit. The next phase of functionality of the circuit breaker is not related to the interruption process because not only can the fault current be interrupted from the converter before this stage but also even can be isolated from the converter and also the rest of system. This phase of operation includes the isolated faulty cables discharge process.

Figure 12:
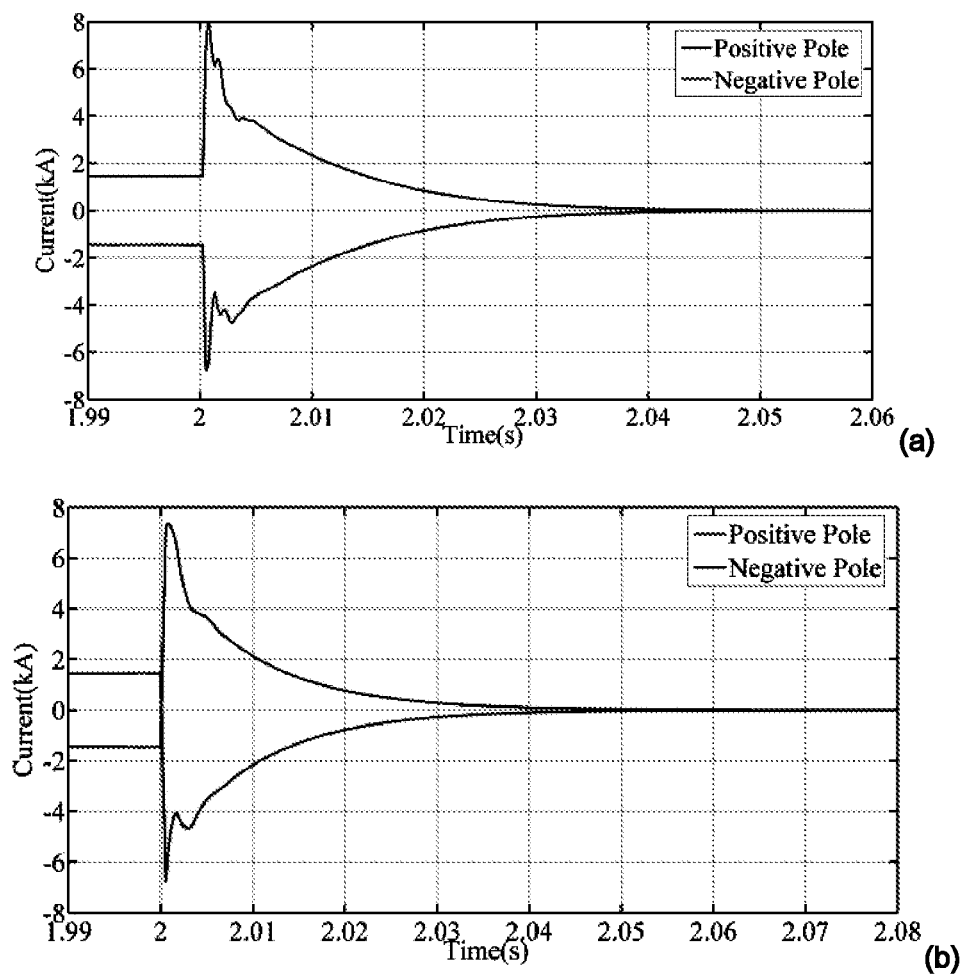
FIG. 12: Schematic representation of the positive and negative cables current around the interruption instant at: (a) rectifier side, (b) inverter side.
Figure 13A:
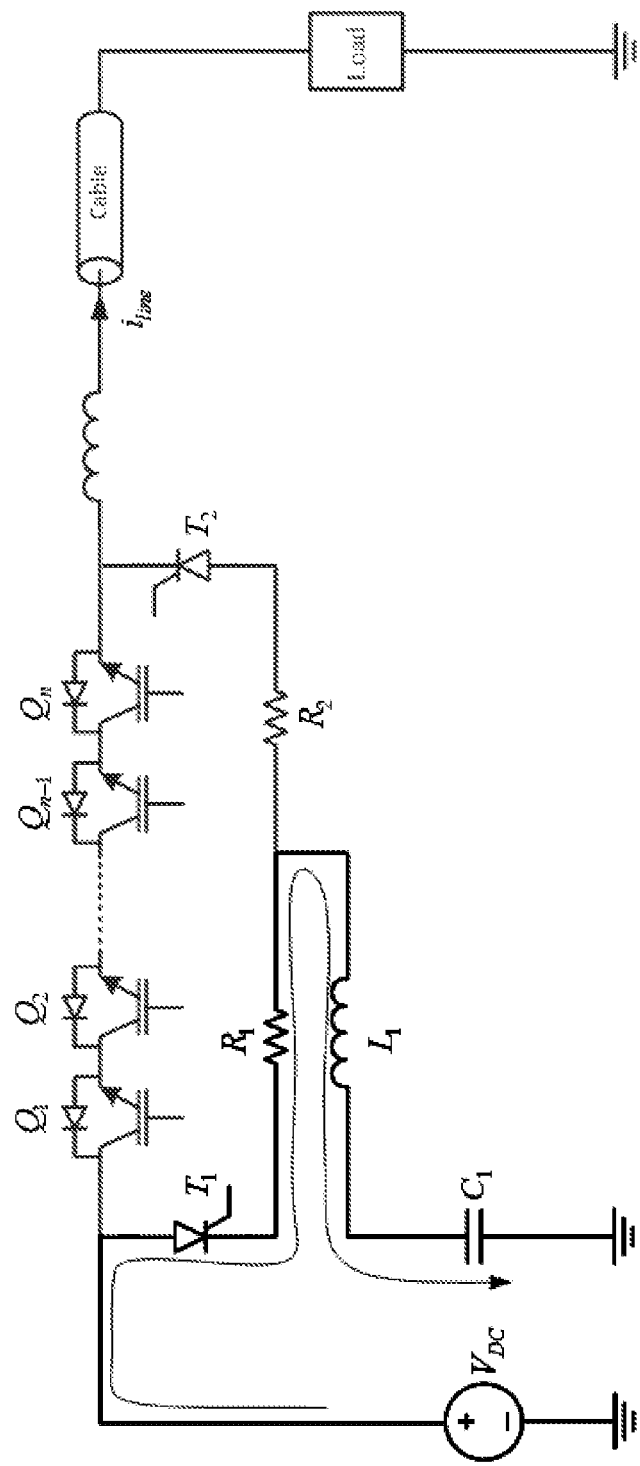
FIG. 13: Schematic representation of (a) charging stage of an embodiment of the circuit breaker; (b) initial interruption stage of an embodiment of the circuit breaker; (c) final interruption stage of an embodiment of the circuit breaker; wherein the main breaker unit of the fast DC circuit breaker is comprised of an association of IGBTs.
Figure 13B:
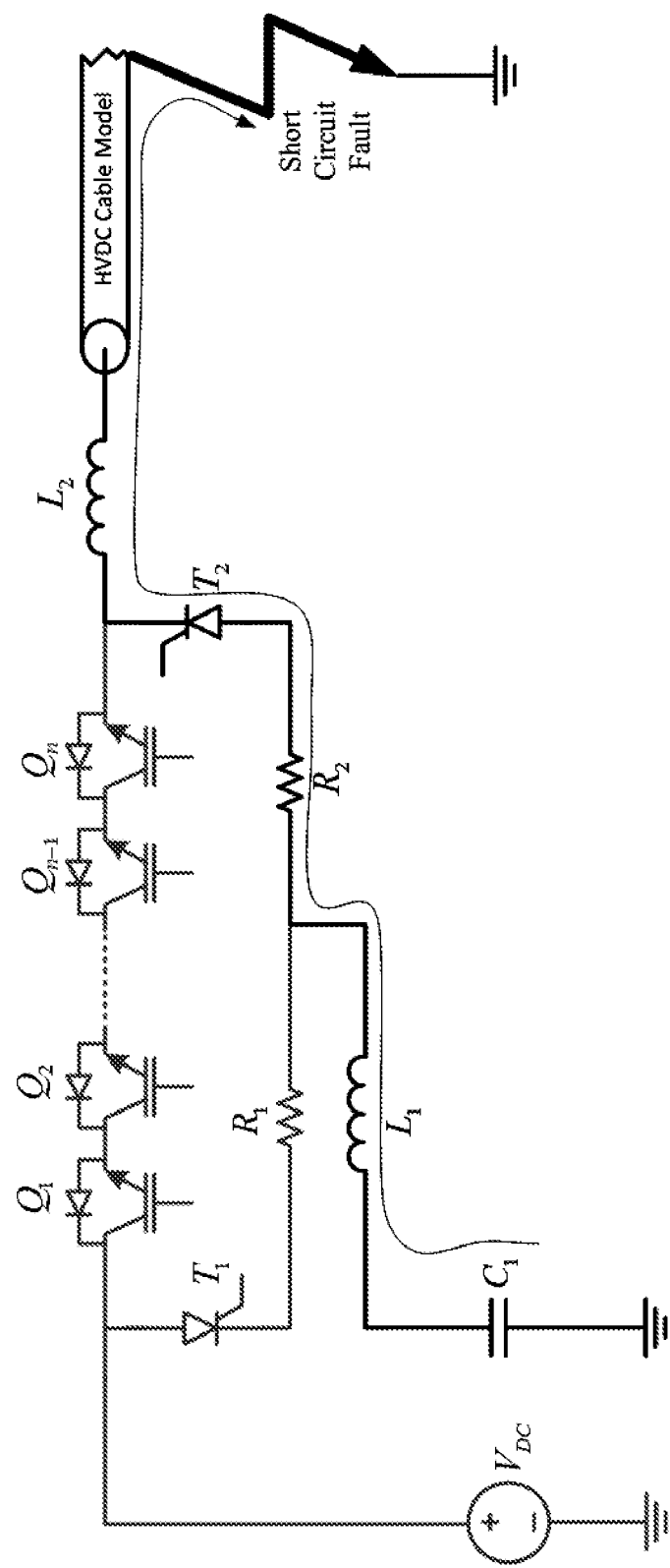
Figure 13C:
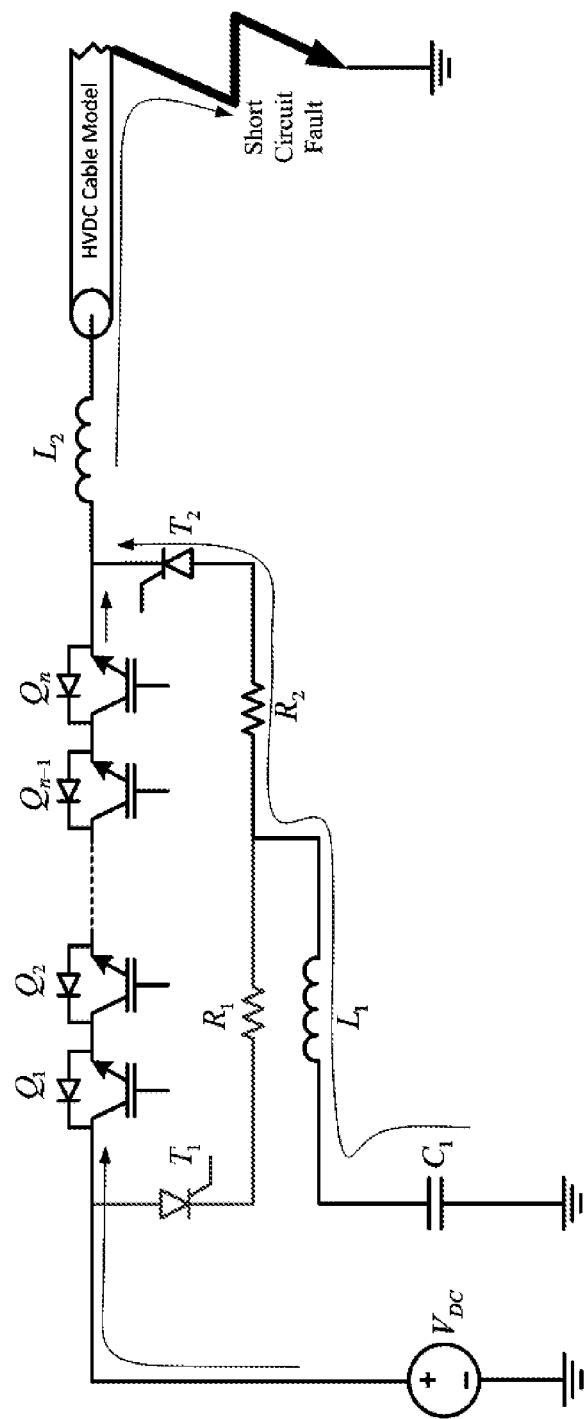

FIG. 12(a) illustrates the positive and negative cables current at the rectifier side while the FIG. 12(b) shows the cables current at the inverter side. As it is expected the cable current reaches 8 kA which is higher than the peak value for the converter current. This is because of presence of capacitor after turning off the IGBTs of the circuit breaker. The discharge time can be designed to be faster or slower based on the circuit breaker parameters. There should be a trade-off between the circuit breaker size, peak current, surge voltage level and also discharge time.

In conclusion, the interruption of high DC fault currents in very short period of time can generate highly destructive excessive voltage across the breaking device which is also harmful for the other components of the system. A fast solid-state HVDC circuit breaker which is equipped by the surge suppressor branch is disclosed and the results analysed. Obtained results confirm that the disclosed auxiliary surge suppressor apparatus is able to limit the transient surge voltage within the acceptable range. The combination of the disclosed surge suppressor branch with the fast solid-state current interrupter devices cut the fault current from the related converter, before it reaches high values. This feature also reduces the sizing of semiconductor devices inside the SSCB.

Moreover, the disclosed SSCB employs less number of IGBTs and diodes in comparison with the conventional structures and has less power losses. Total power losses of the circuit breaker with IGBT based main breaker unit is less than 0.08% of rated power which is quite less than power losses of related VSC. The conduction power losses of the circuit breaker could fall below 0.04% of rated power if main breaker unit is implemented with IGCTs.

In addition, the disclosed circuit breaker uses simple components like capacitor and resistors for discharging the stored energy of the cable instead of MOVs which makes it more economical and robust and eliminates need for regular maintenance. All in all, results show significant improvements in comparison with prior-art circuit breaker topologies.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A surge suppressor for a direct-current power transmission circuit breaker having a DC bus terminal, a transmission line terminal, and a common terminal, said suppressor comprising:
   an auxiliary branch comprising a pre-chargeable capacitor, wherein the auxiliary branch is arranged such that:
      the capacitor is configured to be charged by the DC bus before the circuit breaker is closed for operation; and
      the capacitor is connected to be discharged to the transmission line when the circuit breaker is opened in operation, for suppressing the surge voltage across the circuit breaker;
   wherein the auxiliary branch comprises a charge sub-branch connected between the DC bus terminal and the common terminal, said charge sub-branch comprising a first controlled semiconductor switch for closing the charge sub-branch and charging the capacitor by the DC bus before the circuit breaker is closed,
   wherein the charge sub-branch comprises a resistor and an inductance connected in series with said capacitor for limiting a value and rate of variation of a charge current of said capacitor.

2. The surge suppressor of claim 1, wherein the surge suppressor is arranged such that the first controlled semiconductor switch opens after the capacitor is charged.

3. The surge suppressor of claim 1, wherein the charge sub-branch resistor and inductance are connected in series with said capacitor for limiting a value and rate of variation of a charge current of said capacitor within operational limits of the first controlled semiconductor switch.

4. The surge suppressor of claim 3, wherein a resistance of said charge sub-branch resistor is such that the charge current of said capacitor is within the operational limits of the capacitor.

5. The surge suppressor of claim 1, wherein the auxiliary branch comprises a discharge sub-branch connected between the transmission line terminal and the common terminal, said discharge sub-branch comprising a second controlled semiconductor switch for closing the discharge sub-branch and discharging the capacitor to the transmission line when the circuit breaker is opened in operation, for suppressing the surge voltage across the circuit breaker.

6. The surge suppressor of claim 5, wherein the surge suppressor is arranged such that the second controlled semiconductor switch opens after the capacitor is discharged.

7. The surge suppressor of claim 5, wherein the discharge sub-branch comprises a resistor and an inductance connected in series with said capacitor for limiting a value and rate of variation of a discharge current of said capacitor, in particular within operational limits of the second controlled semiconductor switch.

8. The surge suppressor of claim 7, wherein a capacitance of the capacitor and resistance of the discharge sub-branch resistor are such that the energy stored by the pre-charged capacitor and by the cable inductance in operation is dissipated by said resistor without damage to the resistor or the circuit breaker.

9. The surge suppressor of claim 1, wherein the first controlled semiconductor is a thyristor.

10. The surge suppressor of claim 1, wherein the first controlled semiconductor is an IGBT or IGCT or MOSFET or GTO.

11. The surge suppressor of claim 1, wherein the second controlled semiconductor is a thyristor.

12. The surge suppressor of claim 1, wherein the second controlled semiconductor is an IGBT or IGCT or MOSFET or GTO.

13. A direct-current power transmission circuit breaker comprising:
   a surge suppressor for the direct-current power transmission circuit breaker having a DC bus terminal, a transmission line terminal, and a common terminal, said suppressor comprising:
      an auxiliary branch comprising a pre-chargeable capacitor, wherein the auxiliary branch is arranged such that:
         the capacitor is configured to be charged by the DC bus before the circuit breaker is closed for operation; and
         the capacitor is connected to be discharged to the transmission line when the circuit breaker is opened in operation, for suppressing the surge voltage across the circuit breaker,
      wherein the auxiliary branch comprises a charge sub-branch connected between the DC bus terminal and the common terminal, said charge sub-branch comprising a first controlled semiconductor switch for closing the charge sub-branch and charging the capacitor by the DC bus before the circuit breaker is closed, and wherein the charge sub-branch comprises a resistor and an inductance connected in series with said capacitor for limiting a value and rate of variation of a charge current of said capacitor.

14. The direct-current power transmission circuit breaker of claim 13, further comprising: a main breaker unit, wherein the main breaker unit of the circuit breaker is a solid-state circuit breaker.

15. The direct-current power transmission circuit breaker of claim 14 wherein the main breaker unit of the circuit breaker is comprised of an association of IGBTs, IGCTs or power MOSFETs.

16. The direct-current power transmission circuit breaker of claim 13, wherein the breaker is configured for use in a point to point DC connection, meshed DC grid, multi-terminal HVDC grid, multi infeed HVDC grid or point to point HVDC line.

17. A direct-current power transmission line for two active grids, each grid at each end of the line, comprising two circuit breakers according to claim 13, each circuit breaker being arranged at one of the ends of the power transmission line.

18. A direct-current power transmission circuit breaker of claim 13, wherein the circuit breaker is configured for use in a direct-current power transmission grid, the circuit breaker being arranged at one end of a transmission line of the power transmission grid.

19. A direct-current power transmission line having two ends for connection to one active grid at one end of the transmission line, comprising:

a circuit breaker being arranged at the active grid end of the power transmission line, the circuit breaker comprising:

a surge suppressor for the circuit breaker having a DC bus terminal, a transmission line terminal, and a common terminal, said suppressor comprising:

an auxiliary branch comprising a pre-chargeable capacitor, wherein the auxiliary branch is arranged such that:

the capacitor is configured to be charged by the DC bus before the circuit breaker is closed for operation; and the capacitor is connected to be discharged to the transmission line when the circuit breaker is opened in operation, for suppressing the surge voltage across the circuit breaker, wherein the auxiliary branch comprises a charge sub-branch connected between the DC bus terminal and the common terminal, said charge sub-branch comprising a first controlled semiconductor switch for closing the charge sub-branch and charging the capacitor by the DC bus before the circuit breaker is closed, and wherein the charge sub-branch comprises a resistor and an inductance connected in series with said capacitor for limiting a value and rate of variation of a charge current of said capacitor.

* * * * *